(12) United States Patent
Drebes et al.

(10) Patent No.: US 9,421,710 B2
(45) Date of Patent: Aug. 23, 2016

(54) DEVICE AND METHOD FOR MANUFACTURING PLASTIC CONTAINERS

(71) Applicant: MAGNA STEYR Fuel Systems GesmbH, Sinabelkirchen (AT)

(72) Inventors: Mario Drebes, Berlin (DE); Jörg Gross, Wessling (DE)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 406 days.

(21) Appl. No.: 14/244,851

(22) Filed: Apr. 3, 2014

(65) Prior Publication Data

US 2014/0300022 A1 Oct. 9, 2014

(30) Foreign Application Priority Data

Apr. 4, 2013 (EP) .................................. 13162273

(51) Int. Cl.
*B29C 51/22* (2006.01)
*B29C 51/10* (2006.01)
*B29C 51/26* (2006.01)
*B29C 51/38* (2006.01)
B29L 31/00 (2006.01)

(52) U.S. Cl.
CPC ............... *B29C 51/22* (2013.01); *B29C 51/10* (2013.01); *B29C 51/267* (2013.01); *B29C 51/38* (2013.01); *B29L 2031/7172* (2013.01)

(58) Field of Classification Search
CPC ....... B29C 51/26; B29C 51/38; B29C 51/10; B29C 51/267; B29C 51/122; B29L 2031/7172
USPC ........ 264/320; 425/409, 418, 345, 346, 575, 425/576
See application file for complete search history.

(56) References Cited

U.S. PATENT DOCUMENTS

| | | | | |
|---|---|---|---|---|
| 1,368,836 A | * | 2/1921 | Priester | ..................... B30B 1/12 425/151 |
| 1,388,124 A | * | 8/1921 | Roberts | ................. B29C 51/267 156/292 |
| 1,388,125 A | * | 8/1921 | Roberts | ................. B29C 31/066 425/235 |
| 1,574,113 A | * | 2/1926 | Roberts | ................. B29C 51/267 264/163 |
| 2,796,033 A | * | 6/1957 | Feinstein | .................. A23G 1/21 29/463 |
| 3,357,054 A | * | 12/1967 | Hartman, Jr. | ........... B29C 51/10 425/160 |
| 3,624,672 A | * | 11/1971 | Spivy | .................... B29C 33/202 264/54 |
| 3,649,152 A | * | 3/1972 | Knack, Sr. | .............. B29C 51/10 425/388 |
| 3,816,052 A | * | 6/1974 | Schoppee | ............... B29C 51/38 100/264 |

(Continued)

FOREIGN PATENT DOCUMENTS

CN 201471700 U 5/2010
DE 11 47 029 B 4/1963

(Continued)

OTHER PUBLICATIONS

Office Action and Search Report for Chinese Patent Application No. 201410132285.4, mailed Dec. 25, 2015, 6 pages including 3 pages of English translation.

*Primary Examiner* — Alison L Hindenlang
*Assistant Examiner* — Emmanuel S Luk
(74) *Attorney, Agent, or Firm* — Jordan IP Law, LLC; Todd A. Vaughn

(57) ABSTRACT

An apparatus and method for the production of plastic containers, in particular, plastic tanks, for example, fuel tanks for motor vehicles.

20 Claims, 8 Drawing Sheets

(56) References Cited

U.S. PATENT DOCUMENTS

| | | | | |
|---|---|---|---|---|
| 4,005,961 A | * | 2/1977 | Manceau | B29C 45/10 425/188 |
| 4,383,814 A | * | 5/1983 | Roccati | B30B 7/02 425/338 |
| 4,877,387 A | * | 10/1989 | Fierkens | B23Q 7/1426 249/83 |
| 5,759,591 A | * | 6/1998 | Rhoades | B29C 51/087 156/285 |
| 5,852,970 A | * | 12/1998 | Bornhorst | B21D 22/00 100/264 |
| 6,123,538 A | * | 9/2000 | Kutalowski | B29C 45/045 264/328.16 |
| 6,447,280 B1 | * | 9/2002 | Grimm | B29C 45/045 425/116 |
| 6,555,037 B1 | * | 4/2003 | Payne | E04C 2/205 264/255 |
| 2003/0090041 A1 | * | 5/2003 | Nemeskeri | B29C 37/0007 264/544 |
| 2004/0178543 A1 | * | 9/2004 | Fitzell, Jr. | B29C 51/261 264/545 |
| 2006/0073230 A1 | * | 4/2006 | Ikeda | B29C 31/047 425/394 |
| 2010/0282759 A1 | * | 11/2010 | Eckhardt | B29C 49/0047 220/567.2 |

FOREIGN PATENT DOCUMENTS

| | | |
|---|---|---|
| EP | 1314528 A2 | 5/2003 |
| FR | 412 649 A | 7/1910 |
| JP | H05229015 A | 9/1993 |
| WO | 2004062889 A1 | 7/2004 |

\* cited by examiner

DEVICE AND METHOD FOR MANUFACTURING PLASTIC CONTAINERS

CROSS-REFERENCE TO RELATED APPLICATIONS

The present application claims priority 35 U.S.C. §119 to European Patent Publication No. EP 13162273.0 (filed on Apr. 4, 2013) which is hereby incorporated by reference in its entirety.

TECHNICAL FIELD

Embodiments relate to an apparatus and method for the production of plastic containers, in particular of plastic tanks, for example, fuel tanks for motor vehicles.

BACKGROUND

For the production of plastic containers, in particular plastic tanks, it is known to employ the method of thermoforming and, correspondingly, thermoform pressing. Further, what may be referred to as double-ply thermoforming or double-mould thermoforming is known, in which plastic half-shells are simultaneously thermoformed in two moulds and are subsequently welded to one another in the hot and pasty state at their margins to form a hollow body.

A method for the double-ply thermoforming of plastic fuel tanks and an apparatus for the production of plastic fuel tanks are known from WO Patent Publication No. WO 2004/062889 A1, two heated plastic plies being moved independently of one another to a thermoforming station, the individual plastic plies being lowered into a first and a second shaping die, the first and the second die being arranged laterally next to one another, each plastic ply being thermoformed into a shell, and one of the shaping dies, together with the thermoformed shell, being overturned and arranged above the other die, and, finally, overlapping sealing regions of the shells being pressed together and being thermally fused.

European Patent Publication No. EP 1 314 528 A2 discloses a thermoforming press for the production of formed parts, comprising a mould supporting table, which is suspended on a frame beneath a forming-die subassembly, and a pair of moulds which are mounted side to side on the mould supporting table, means being provided for pivoting the said mould supporting table along an arcuate reciprocating path and for alternately aligning and registering one of the said moulds and then the other of the said moulds with the forming-die subassembly.

SUMMARY

Embodiments relate to an enhanced apparatus and method for the production of plastic containers, as a result of which, in particular, the throughput may be increased and at the same time it becomes possible for the apparatus to have a compact construction.

In accordance with embodiments, an apparatus for the production of plastic containers includes at least one of: a first press platen with a first mould half and a pivoting arm with a second mould half to accommodate heated and thermoformed plastic half-shells, a second press platen with a third mould half and the pivoting arm having a fourth mould half to accommodate heated and thermoformed plastic half-shells, wherein in a first position of the pivoting arm spatially above the first press platen, the first mould half and the second mould half open towards one another such that, by the first mould half being pressed onto the second mould half, the plastic half-shells accommodated therein may be welded to one another at overlapping margins, wherein in a second position of the pivoting arm spatially above the second press platen, the third and the fourth mould half being opened towards one another, so that, by the third mould half being pressed onto the fourth mould half, the plastic half-shells accommodated therein may be welded to one another at their overlapping margins.

In accordance with embodiments, a method for the production of plastic containers includes at least one of: introducing heated plastic plates in a first upwardly open mould half arranged on a first press platen and a second upwardly open mould half the second mould half arranged on a pivoting arm; thermoforming the heated plastic plates into first and second plastic half-shells; after thermoforming, manipulating the pivoting arm to a first position spatially above the first press platen such that the first mould half and the second mould half are open towards one another; pressing the first mould half onto the second mould half; welding the first and second plastic half-shells to one another at overlapping margins thereof; introducing heated plastic plates in a third upwardly open mould half arranged on a second press platen and a fourth upwardly open mould half arranged on the pivoting arm; thermoforming the heated plastic plates into third and fourth plastic half-shells; after thermoforming, manipulating the pivoting arm to a second position spatially above the second press platen such that the third mould half and the fourth mould half are open towards one another; pressing the third mould half onto the fourth mould half; and welding the third and fourth plastic half-shells to one another at overlapping margins thereof.

In accordance with embodiments, there is provision for using two press platens on which a mould half is arranged in each case. The two associated mould halves which complete the mould halves on the press platens are arranged on a common pivoting arm. Thus, by way of a single pivoting movement of the pivoting arm, a pair of moulds, for example, a first and a second mould half, may be moved spatially closer to one another and be brought into a position for welding, and at the same time a second pair of moulds, for example, the third and the fourth mould half, may be opened in order to extract the welded container. Thus, also, while one pair of moulds is closed and the welded container cools therein, heated plastic plates may be introduced simultaneously into the mould halves of the other pair of moulds and be thermoformed into plastic half-shells.

In accordance with embodiments, any combination of the first mould half, the second mould half, the third mould half and the fourth mould half comprises a thermoforming station, so that a heated plastic plate may be introduced into the respective mould half and the plastic half-shell is thermoformed out of the plastic plate in the respective mould half.

In accordance with embodiments, the thermoforming stations comprises vacuum thermoforming stations, so that the plastic plates are drawn into the respective mould halves by a vacuum.

In accordance with embodiments, the second mould half and the fourth mould half may be arranged on opposite sides of the pivoting arm, so that the orifices of the mould halves in each case point away from the pivoting arm. The pivoting arm may then be mounted approximately in the middle between the first press platen and the second press platen and may be pivoted vertically through about 180 degrees between the first position and the second position.

In accordance with embodiments, the pivoting arm may comprise, for example, a vertical immovable pivoting-arm pillar and a pivotable pivoting table which is mounted on and/or over the pivoting-arm pillar and which carries the second and the fourth mould half. In the context of embodiments, a pivoting movement of the pivoting arm may comprise a pivoting movement of the pivotable pivoting table of the pivoting arm.

In accordance with embodiments, the pivoting arm may be pivoted between the first position and the second position by way of a geared motor or by way of a hydraulic motor.

In accordance with embodiments, the pivoting movement of the pivoting arm may be assisted by a device which utilizes the weight of the pivoting arm for lifting the pivoting arm. This may, in particular, be a spring device or a hydraulic device which is pre-stressed in the lifting direction as a result of the lowering of the pivoting arm.

In accordance with embodiments, the press of the first press platen and/or of the second press platen may be operated mechanically, hydraulically and/or hydro-pneumatically. In particular, one or both presses may be operated at least in two stages, for example, in a first, high-speed phase with a higher closing speed and lower closing force, and in a second, force phase with a higher closing force. In this case, for example, the high-speed phase may be driven mechanically and the force phase hydraulically.

The method for the production of plastic containers in accordance with embodiments may include, drawing via a vacuum the plastic plates in at least one of the first mould half, the second mould half, the third mould half and the fourth mould half for thermoforming into the respective mould halves.

In accordance with embodiments, the plastic plates may be introduced into the first and the second mould half, and also thermoformed while plastic half-shells welded to one another cool in the third and the fourth mould half. Plastic plates may also be introduced into the third and the fourth mould half, and also thermoformed while plastic half-shells welded to one another cool in the first and the second mould half. Therefore, alternately, the plastic is prepared and thermoformed in one pair of moulds while a container cools in the other pair of moulds.

In accordance with embodiments, insert parts may be introduced into at least one of the first mould half, the second mould half, the third mould half and the fourth mould half after the thermoforming of the plastic half-shells and before the welding of the plastic half-shells in pairs. Insert parts may, for example, also be introduced into the plastic half-shells before thermoforming.

In accordance with embodiments, the pivoting arm or the pivotable pivoting table of the pivoting arm, which pivoting table carries the second and the fourth mould half, may be locked in its position before pressing, for example, mechanically, for example by way of a bolt which may be driven into a bore, by way of a paul or rotary latch, or else electrically, hydraulically or pneumatically, so that the locked pivoting arm may withstand the forces during pressing.

In accordance with embodiments, an apparatus for producing plastic containers may include at least one of: a first press platen including a pivoting arm, a first mould half and a second mould half arranged on the pivoting arm, the first mould half and the second mould half configured to accommodate heated and thermoformed plastic half-shells; and a second press platen including the pivoting arm, a third mould half and a fourth mould half arranged on the pivoting arm, the third mould half and the fourth mould half configured to accommodate heated and thermoformed plastic half-shells, wherein the pivoting arm is movable between a first position above the first press platen in which the first mould half and the second mould half are opened towards one another such that, by the first mould half being pressed onto the second mould half, the plastic half-shells may be connected to one another at overlapping margins thereof, and from the first position to a second position above the second press platen in which the third mould half and the fourth mould half are opened towards one another such that, by the third mould half being pressed onto the fourth mould half, the plastic half-shells may be welded to one another at overlapping margins thereof.

In accordance with embodiments, an apparatus for producing motor vehicle fuel tanks may include at least one of: a first press platen including a pivoting arm having a pivoting-arm pillar and a pivotable pivoting table, a first mould half and a second mould half arranged on the pivotable pivoting table, the first mould half and the second mould half configured to accommodate heated and thermoformed plastic half-shells; and a second press platen including the pivoting arm, a third mould half and a fourth mould half arranged on the pivotable pivoting table, the third mould half and the fourth mould half configured to accommodate heated and thermoformed plastic half-shells, wherein the pivoting arm is movable between a first position above the first press platen in which the first mould half and the second mould half are opened towards one another such that, by the first mould half being pressed onto the second mould half, the plastic half-shells may be connected to one another, and from the first position to a second position above the second press platen in which the third mould half and the fourth mould half are opened towards one another such that, by the third mould half being pressed onto the fourth mould half, the plastic half-shells may be welded to one another.

In accordance with embodiments, a method for producing plastic containers may include at least one of: providing a first press platen including a pivoting arm, a first mould half and a second mould half arranged on the pivoting arm, and a second press platen including the pivoting arm, a third mould half and a fourth mould half arranged on the pivoting arm; introducing first heated plastic plates in the first mould half and the second mould half by manipulating the pivoting arm to a first position above the first press platen in which the first mould half and the second mould half are opened towards one another; thermoforming the first heated plastic plates into first plastic half-shells; pressing the first mould half onto the second mould half; connecting the first plastic half-shells accommodated in the first and second mould halves to one another at overlapping margins thereof; introducing second heated plastic plates in the third mould half and the fourth mould half by manipulating the pivoting arm from the first position to a second position above the second press platen in which the third mould half and the fourth mould half are opened towards one another; thermoforming the second heated plastic plates into second plastic half-shells; pressing the first mould half onto the second mould half; connecting the second plastic half-shells accommodated in the third and fourth mould halves to one another at overlapping margins thereof.

DRAWINGS

Embodiments will be illustrated by way of example in the drawings and explained in the description below.

DESCRIPTION

Figure 1:
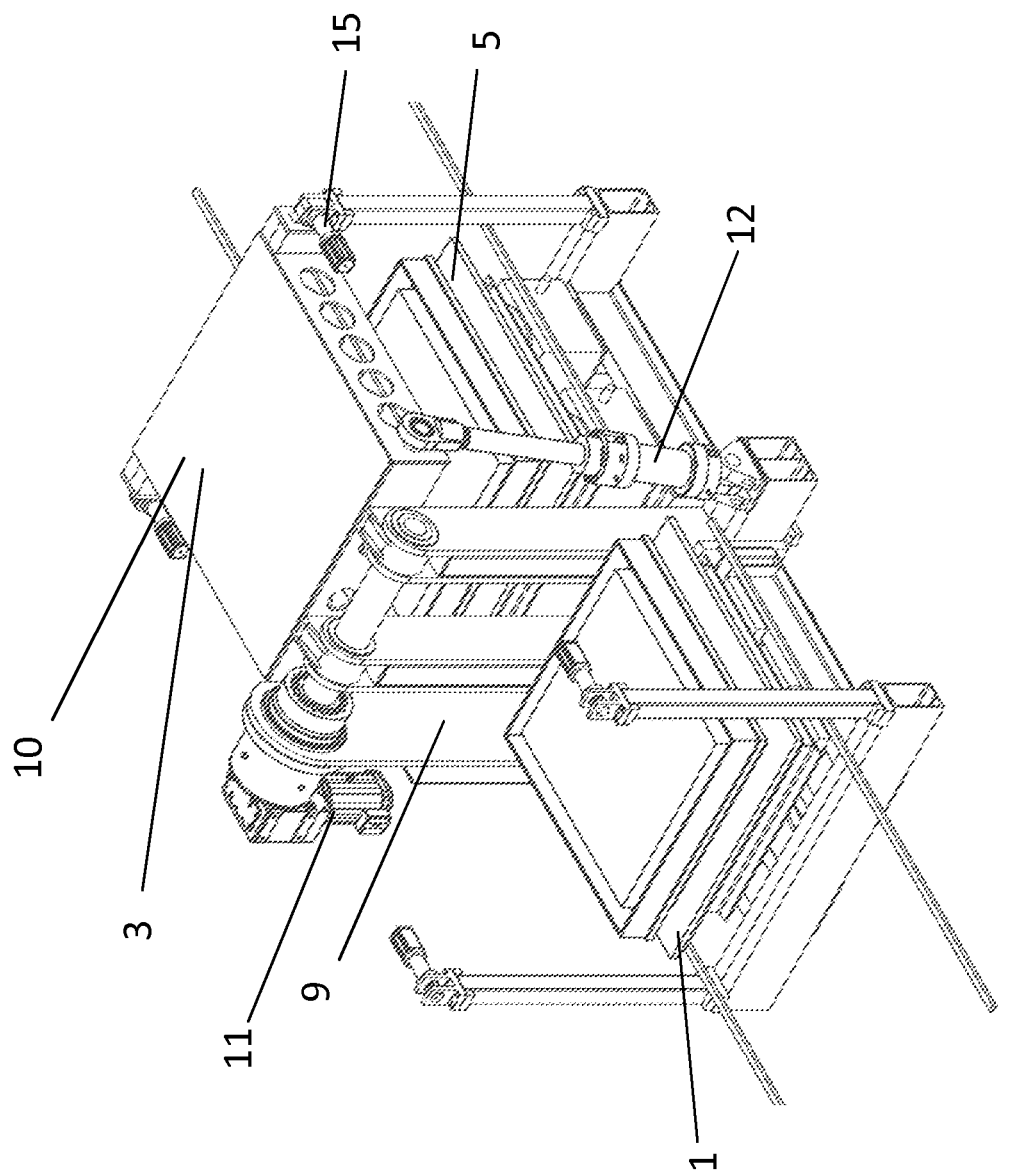
FIG. 1 illustrates a perspective view of an apparatus for the production of plastic containers, in accordance with embodiments.
Figure 2:
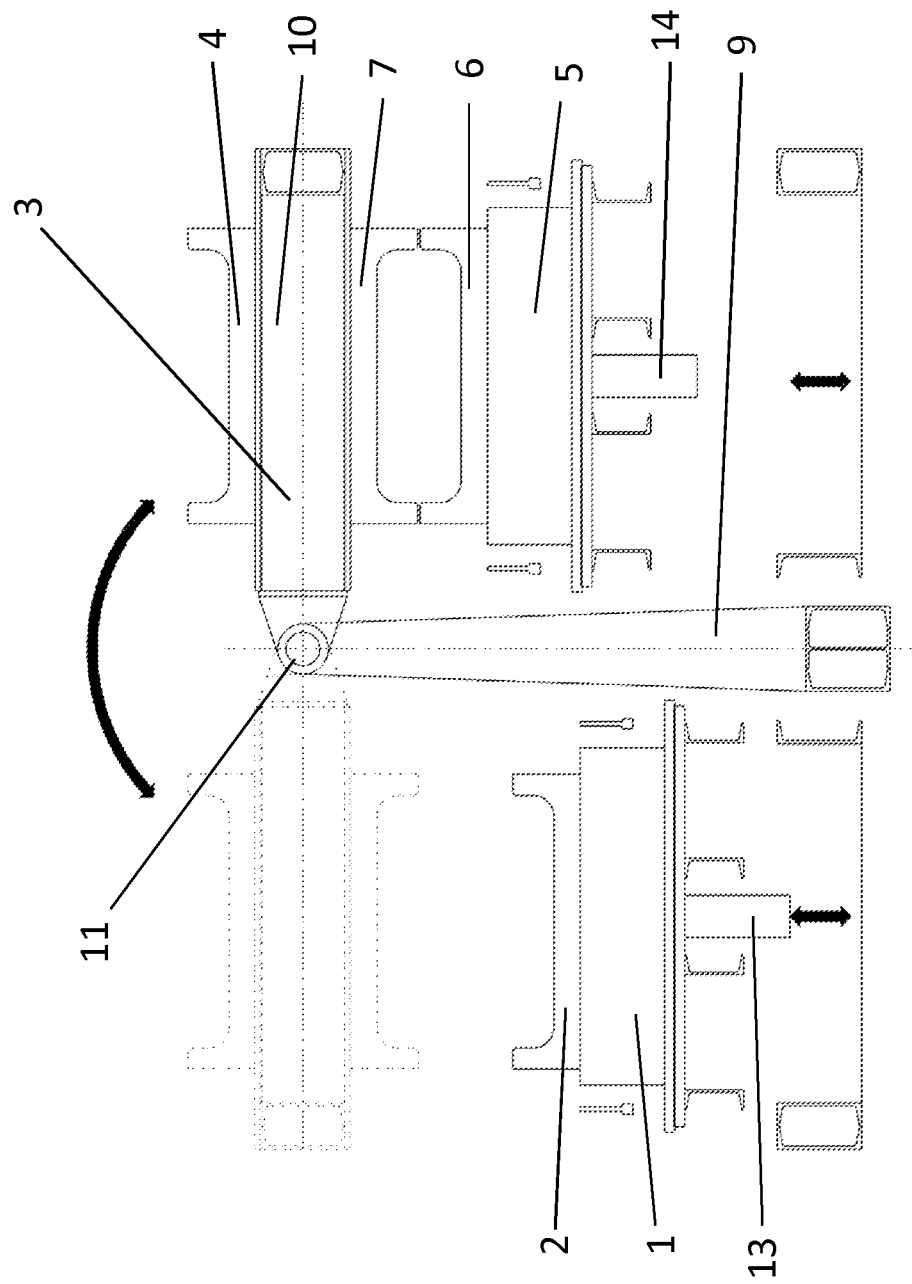
FIG. 2 illustrates a diagrammatic view of an apparatus for the production of plastic containers, in accordance with embodiments.
Figure 3:
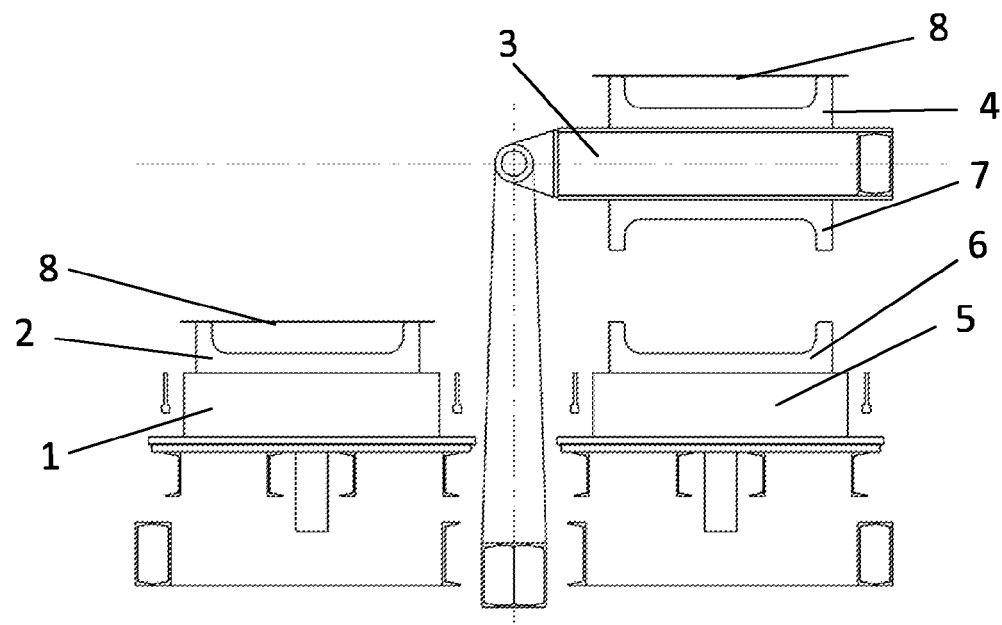
FIGS. 3-8 illustrate a method for the production of plastic containers, in accordance with embodiments.

As illustrated in FIGS. 1 and 2, an apparatus for the production of plastic containers, in accordance with embodiments. The apparatus includes a first press platen 1, a second press platen 5 and a pivoting arm 3 between the press platens 1, 5. The pivoting arm 3 includes a pivoting-arm pillar 9 and a pivoting table 10 mounted pivotably on the pivoting-arm pillar 9. The first press platen 1 is associated with a first press 13 and the second press platen 5 is associated with a second press 14.

As illustrated in FIG. 2, on and/or over the first press platen 1, a first mould half 2 may be arranged, which together with a second mould half 4 arranged on the pivoting arm 3 on a side of the pivoting table 10 which faces the first press platen 1, forms a cooperating pair of moulds. Heated and thermoformed plastic half-shells may be accommodated in the first mould half 2 and the second mould half 4. For this purpose, as further illustrated in FIGS. 3-8, plastic plates 8 held approximately level are laid onto the mould halves 2 and 4 and thermoformed in the mould halves 2, 4.

The apparatus has a third mould half 6 on the second press platen 5. The pivoting arm 3 has a fourth mould half 7, heated and thermoformed plastic half-shells being accommodatable in the third mould half 6 and the fourth mould half 7.

FIGS. 1 and 2 illustrate the pivoting arm 3 in each case in a second position of the pivoting arm 3 in which the third mould half 6 and the fourth mould half 7 are open towards one another, so that, by the third mould half 6 being pressed onto the fourth mould half 7, the heated plastic half-shells accommodated therein may be welded to one another at their overlapping margins, in order to form a closed plastic container 20.

As illustrated in FIG. 1, the pivoting arm 3 or its pivoting table 10 may be actuated primarily via a geared motor 11. The pivoting movement of the pivoting arm 3 may in this case be assisted by a hydro-pneumatic spring device 12, so that the geared motor 11 may have smaller dimensioning. The pivoting table 10 may be secured in a horizontal position by way of locks 15, so that it withstands the forces when the mould halves are being pressed one onto the other.

FIGS. 3 to 8 illustrate a method for the production of plastic containers in accordance with embodiments. First, in FIG. 3, the pivoting arm 3 of the apparatus is still in the second position in which the orifices of the third and the fourth mould halves 6, 7 are opposite one another. The orifices of the first mould half 2 and the second mould half 4 point upwards, so that preheated plastic plates 8 may be arranged on them and sealed off at their margins with respect to the mould halves 2, 4 by way of suitable sealing frames.

Figure 4:
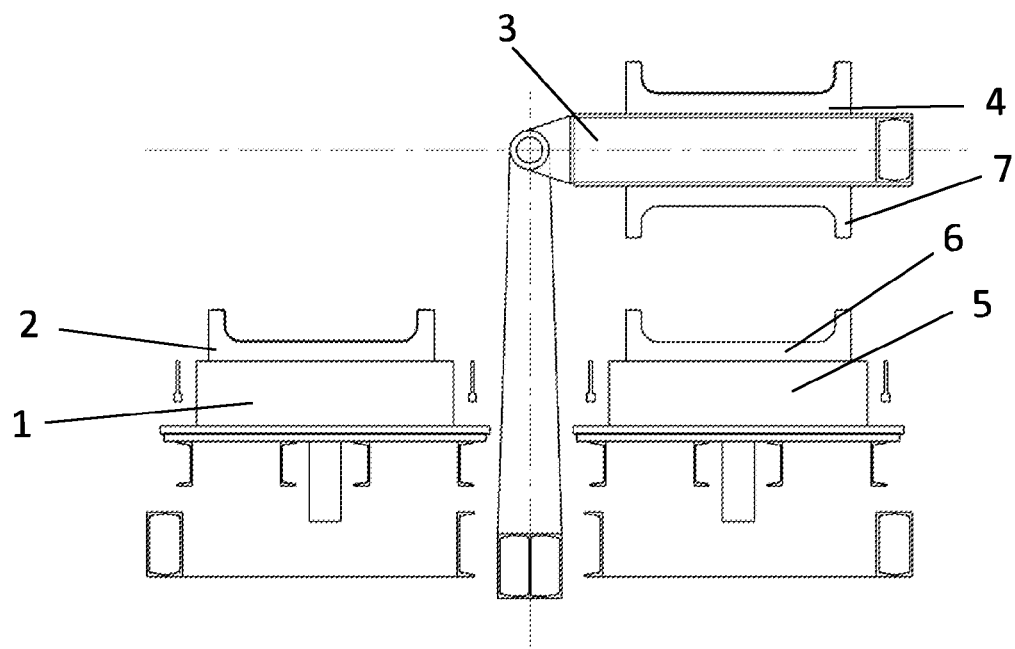

As illustrated in FIG. 4, the plastic plates 8 are thermoformed in the mould halves 2, 4 by a vacuum, so that they are drawn into the mould halves 2, 4. Thereupon, insert parts may be introduced into the formed plastic shells and fastened such as, for example, welded, thereto.

Figure 5:
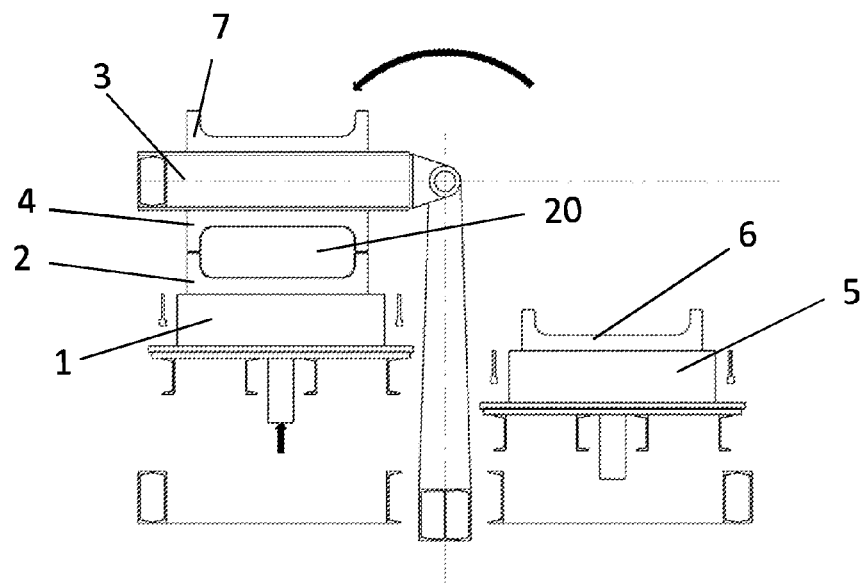

As illustrated in FIG. 5, next the pivoting arm 3 is pivoted through 180 degrees to the left in the figures, so that the pivoting arm 3 is manipulated to the first position in which the orifices of the first and the second mould half 2, 4 lie opposite one another. The first press platen 1 is manipulated upward and presses together the two plastic shells which are welded to one another at their margins by pressure and heat in order to form a plastic container 20.

Figure 6:
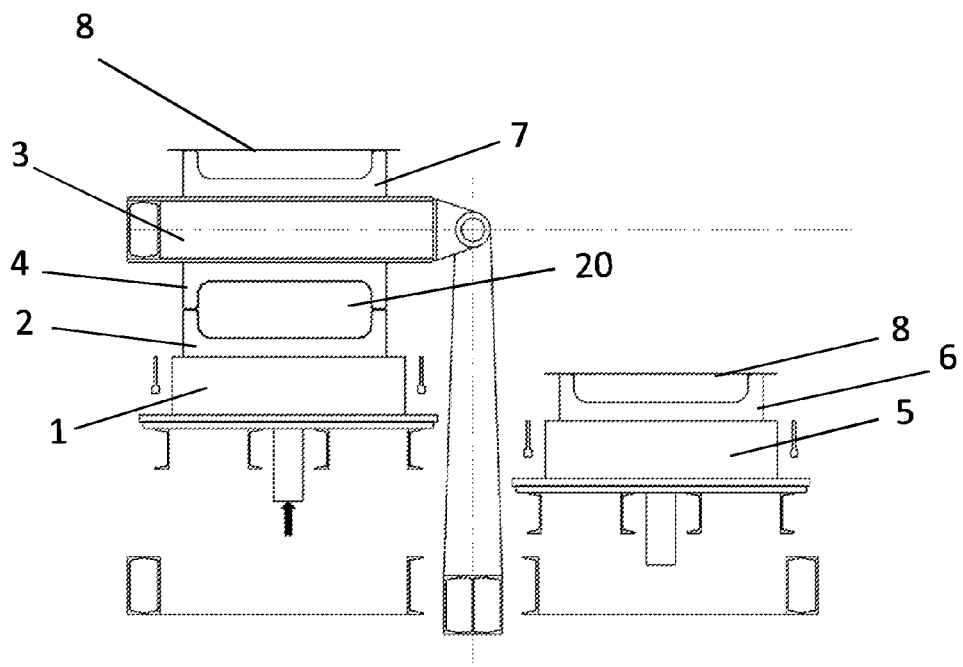

As illustrated in FIG. 6, next the preheated plastic plates 8 may be laid in turn onto the then upwardly open mould halves 6, 7 and sealed off at the margin with respect to the mould halves 6, 7, by way of suitable sealing frames, while the plastic container 20 in the first and second mould half 2, 4 cools.

Figure 7:
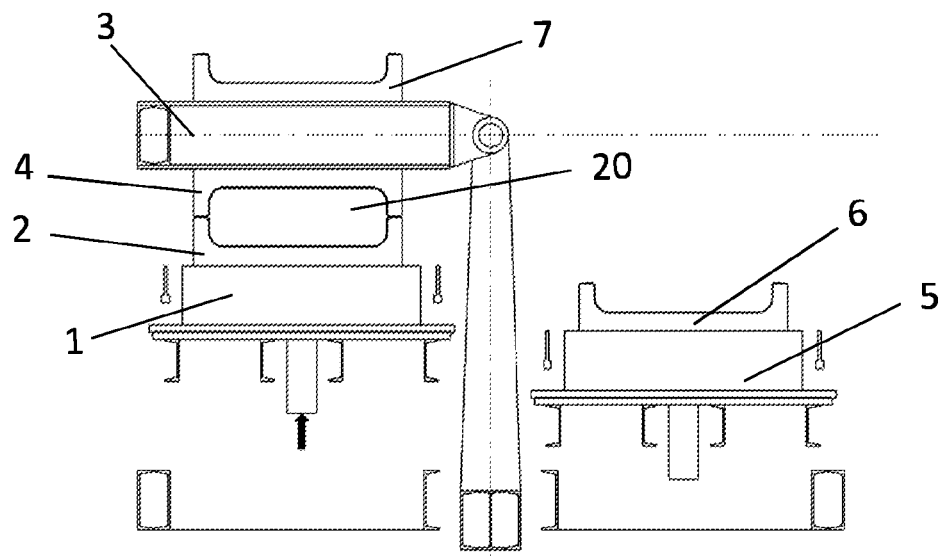

As illustrated in FIG. 7, next the plastic plates 8 on the third and fourth mould halves 6, 7 are vacuum-formed, and once again insert parts may be introduced into the plastic shells and welded thereto. Meanwhile, the plastic container 20 in the first and second mould half 2, 4 cools further.

Figure 8:
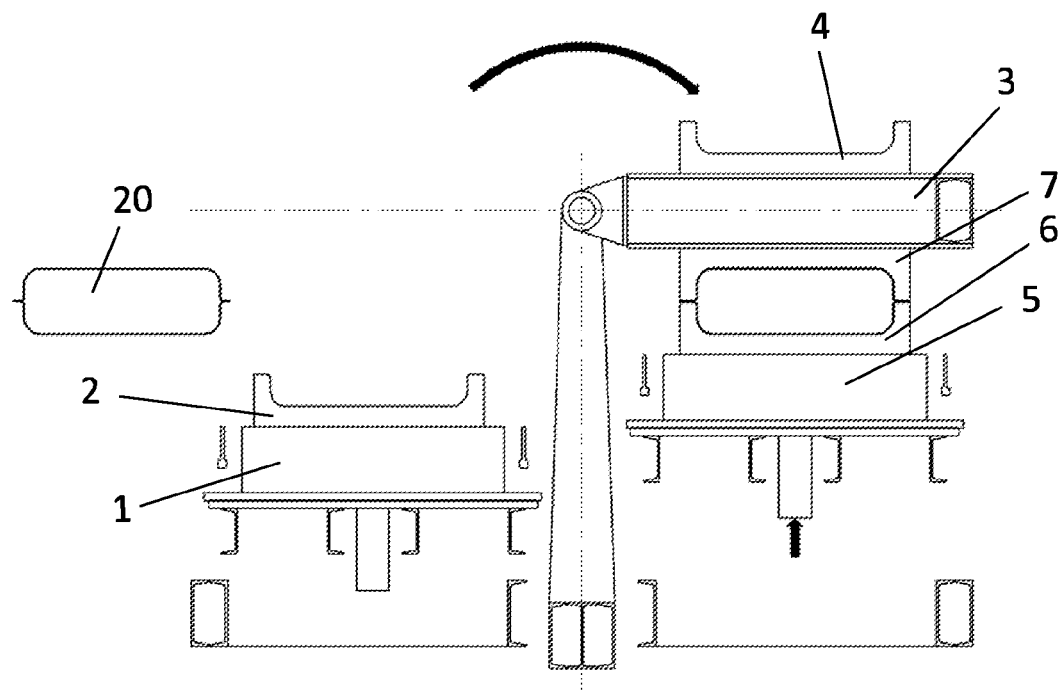

As illustrated in FIG. 8, next the first press platen 1 may be lowered again and the finished plastic container 20 extracted, while the pivoting arm 3 is pivoted back to the second press platen 5 again and a further container is pressed on this second press platen 1.

The method in accordance with embodiments, may then, of course, be repeated as often as desired or necessary. Whenever the pivoting arm 3 is pivoted, a further finished plastic container 20 may be released. The plastic containers 20 produced by way of the first press 13 may be identical to the plastic containers 20 produced on the second press 14, and therefore, be produced with a higher output. Structurally different mould halves, however, may also be used on the press platens, so that two different products may be produced simultaneously.

Figure 9:
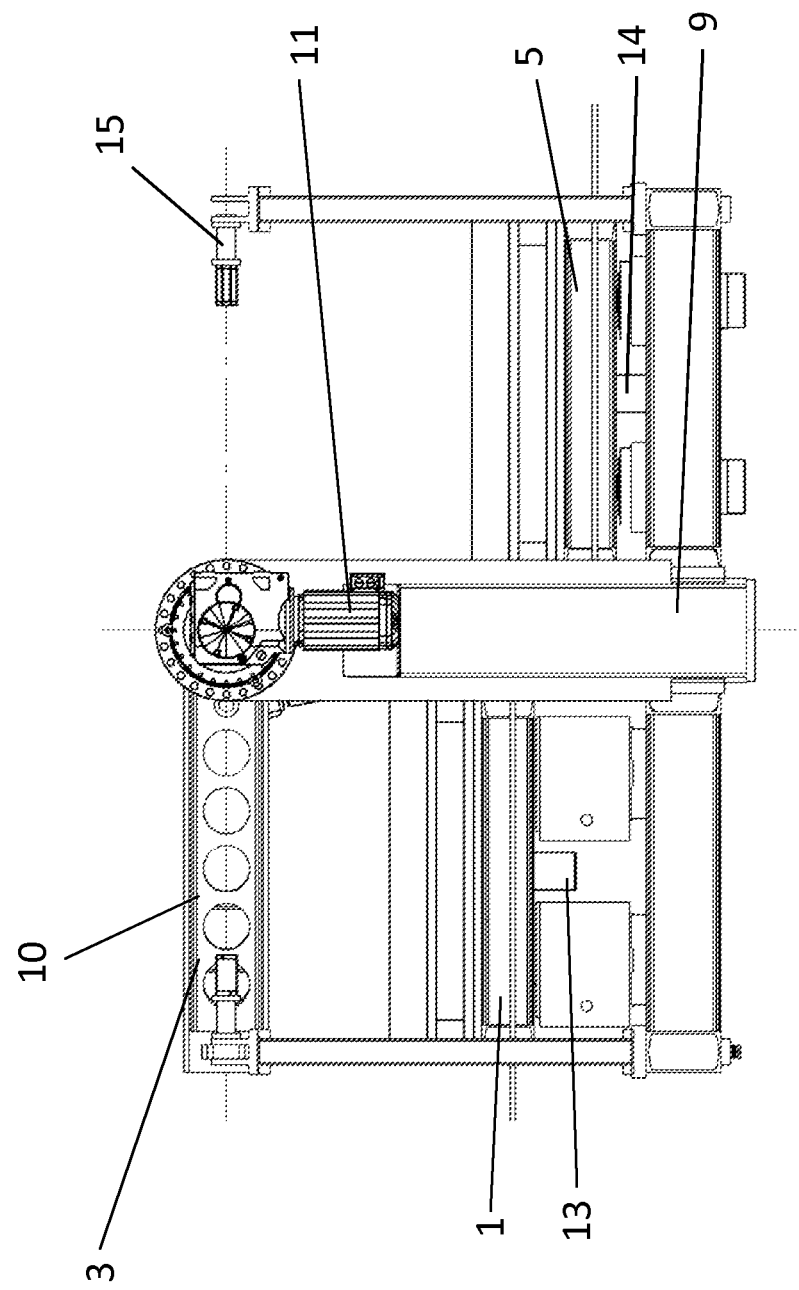
FIG. 9 illustrates a front view of an apparatus for the production of plastic containers, in accordance with embodiments.
Figure 10:
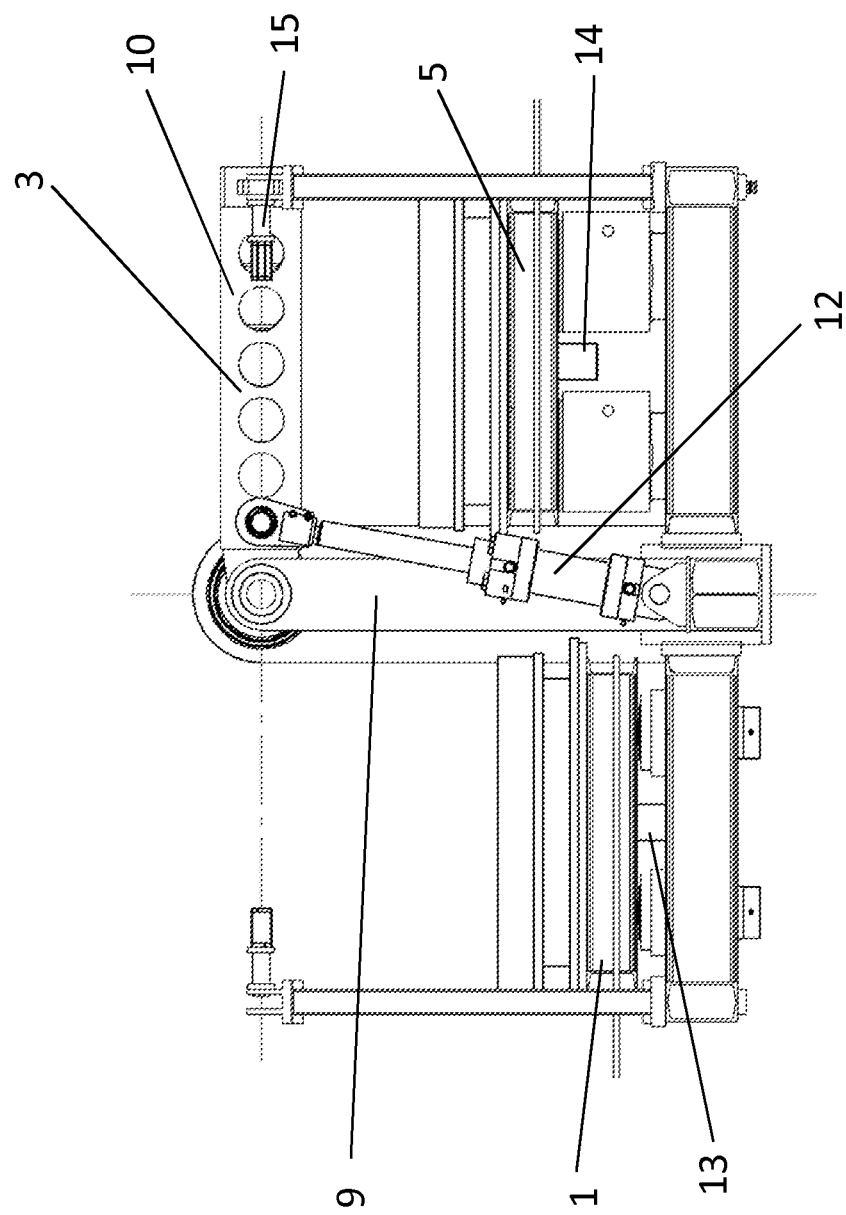
FIG. 10 illustrates a back view of the apparatus of FIG. 9.

As illustrated in FIG. 9, an apparatus for the production of plastic containers illustrated from the side on which the containers are extracted. FIG. 10 is a back view of the apparatus of FIG. 9, for example, from the side on which the plastic plates are supplied.

Figure 11:
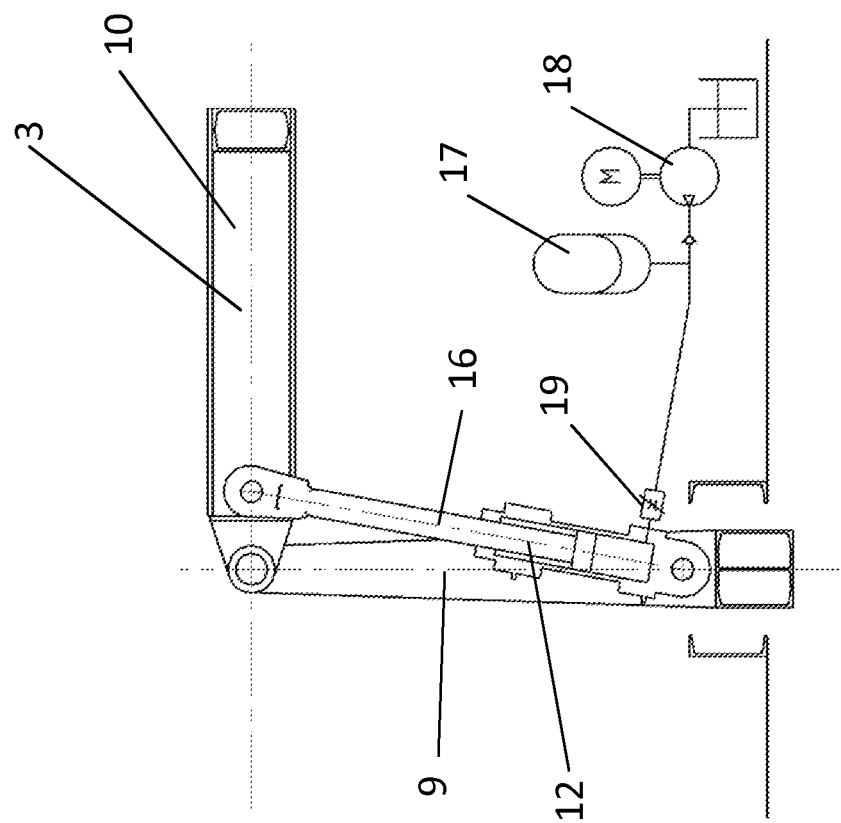
FIG. 11 illustrates a diagrammatic illustration of a spring assistance of an apparatus for the production of plastic containers, in accordance with embodiments.

As illustrated in FIG. 11, the apparatus in accordance with embodiments may include a spring assistance in which the pivoting movement of the pivoting arm 3 may be assisted by a hydro-pneumatic spring device 12. The hydro-pneumatic spring device 12 may use a hydraulic cylinder 16, by way of which the pivoting table 10 may be moved. For this purpose, a hydraulic fluid is stored in a pressure reservoir 17. As a result of a downward movement of the pivoting table 10, the hydraulic fluid is pressed into the pressure reservoir 17 via the hydraulic cylinder 16, and thus, builds up a pressure which may be utilized for subsequently lifting the pivoting table 10. The pressure of the hydraulic fluid may also be controlled actively, for example via a hydraulic pump 18. In order to prevent resonant vibrations of the pivoting arm 3, damping 19 of the spring device 12 may be provided.

Embodiments provide an enhanced apparatus and method for the production of plastic containers, as a result of which, in particular, results in an increase in output with an apparatus having a compact construction.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS 1 first press platen
2 first mould half
3 pivoting arm
4 second mould half
5 second press platen
6 third mould half
7 fourth mould half
8 plastic plate
9 pivoting-arm pillar
10 pivoting table
11 geared motor
12 spring device
13 press
14 press
15 lock
16 hydraulic cylinder
17 pressure reservoir
18 pump
19 damping
20 plastic container

What is claimed is:

1. An apparatus for producing plastic containers, the apparatus comprising:
    a first press platen including a pivoting arm, a first mould half and a second mould half arranged on the pivoting arm, the first mould half and the second mould half configured to accommodate heated and thermoformed plastic half-shells; and
    a second press platen including the pivoting arm, a third mould half and a fourth mould half arranged on the pivoting arm, the third mould half and the fourth mould half configured to accommodate heated and thermoformed plastic half-shells,
    wherein the pivoting arm is movable between a first position above the first press platen in which the first mould half and the second mould half are opened towards one another such that, by the first mould half being pressed onto the second mould half, the plastic half-shells may be connected to one another at overlapping margins thereof, and from the first position to a second position above the second press platen in which the third mould half and the fourth mould half are opened towards one another such that, by the third mould half being pressed onto the fourth mould half, the plastic half-shells may be welded to one another at overlapping margins thereof.

2. The apparatus of claim 1, wherein any combination of the first mould half, the second mould half, the third mould half and the fourth mould half comprise one or more thermoforming stations, so that a heated plastic plate may be introduced into one respective mould half and the plastic half-shell may be thermoformed out of the plastic plate in a respective mould half.

3. The apparatus of claim 2, wherein the one or more thermoforming stations comprise vacuum thermoforming stations, so that the plastic plates are drawn into the respective mould halves by a vacuum.

4. The apparatus of claim 1, wherein the second mould half and the fourth mould half are arranged on opposite sides of the pivoting arm, so that respective orifices of the second mould half and the fourth mould half are directed away from the pivoting arm.

5. The apparatus of claim 1, wherein the pivoting arm is mounted between the first press platen and the second press platen and pivotable moveable vertically through about 180 degrees between the first position and the second position.

6. The apparatus of claim 1, wherein the pivoting arm comprises a pivoting-arm pillar and a pivotable pivoting table which supports the second mould half and the fourth mould half.

7. The apparatus of claim 1, further comprising a motor to manipulate the pivoting arm between the first position and the second position.

8. The apparatus of claim 1, further comprising a spring device to assist in the pivoting movement of the pivoting arm, wherein the spring device utilizes the weight of the pivoting arm for lifting the pivoting arm, in particular a spring device.

9. The apparatus of claim 1, wherein a press of at least one of the first press platen and the second press platen is operated one of mechanically, hydraulically and hydropneumatically.

10. An apparatus for producing motor vehicle fuel tanks, the apparatus comprising:
    a first press platen including a pivoting arm having a pivoting-arm pillar and a pivotable pivoting table, a first mould half and a second mould half arranged on the pivotable pivoting table, the first mould half and the second mould half configured to accommodate heated and thermoformed plastic half-shells; and
    a second press platen including the pivoting arm, a third mould half and a fourth mould half arranged on the pivotable pivoting table, the third mould half and the fourth mould half configured to accommodate heated and thermoformed plastic half-shells,
    wherein the pivoting arm is movable between a first position above the first press platen in which the first mould half and the second mould half are opened towards one another such that, by the first mould half being pressed onto the second mould half, the plastic half-shells may be connected to one another, and from the first position to a second position above the second press platen in which the third mould half and the fourth mould half are opened towards one another such that, by the third mould half being pressed onto the fourth mould half, the plastic half-shells may be welded to one another.

11. The apparatus of claim 10, wherein the pivoting arm is mounted between the first press platen and the second press platen and pivotable moveable vertically through about 180 degrees between the first position and the second position.

12. The apparatus of claim 10, further comprising a motor to manipulate the pivoting arm between the first position and the second position.

13. The apparatus of claim 10, further comprising a spring device to assist in the pivoting movement of the pivoting arm, wherein the spring device utilizes the weight of the pivoting arm for lifting the pivoting arm, in particular a spring device.

14. The apparatus of claim 10, wherein a press of at least one of the first press platen and the second press platen is operated one of mechanically, hydraulically and hydropneumatically.

15. A method for producing plastic containers, comprising:
- providing a first press platen including a pivoting arm, a first mould half and a second mould half arranged on the pivoting arm, and a second press platen including the pivoting arm, a third mould half and a fourth mould half arranged on the pivoting arm;
- introducing first heated plastic plates in the first mould half and the second mould half by manipulating the pivoting arm to a first position above the first press platen in which the first mould half and the second mould half are opened towards one another;
- thermoforming the first heated plastic plates into first plastic half-shells;
- pressing the first mould half onto the second mould half;
- connecting the first plastic half-shells accommodated in the first and second mould halves to one another at overlapping margins thereof;
- introducing second heated plastic plates in the third mould half and the fourth mould half by manipulating the pivoting arm from the first position to a second position above the second press platen in which the third mould half and the fourth mould half are opened towards one another;
- thermoforming the second heated plastic plates into second plastic half-shells;
- pressing the first mould half onto the second mould half;
- connecting the second plastic half-shells accommodated in the third and fourth mould halves to one another at overlapping margins thereof.

16. The method of claim 15, wherein thermoforming the first heated plastic plates and thermoforming the second heated plastic plates is conducted by a vacuum.

17. The method of claim 15, wherein manipulating the pivoting arm from the first position to a second position comprises pivoting the pivoting arm vertically through about 180 degrees between the first position and the second position.

18. The method of claim 15, wherein:
- the first plastic plates are introduced into the first and the second mould halves while second plastic half-shells are connected to one another in the third and the fourth mould halves; and
- the second plastic plates are introduced into the third and the fourth mould halves while the first plastic half-shells are connected to one another in the first and the second mould halves.

19. The method of claim 15, wherein, after thermoforming the first and second plastic half-shells and before connecting the first and second plastic half-shells, introducing insert parts into at least one of the first mould half, the second mould half, the third mould half and the fourth mould half.

20. The method of claim 15, wherein, before pressing, the pivoting arm is locked in its position.

* * * * *